US011432155B2

United States Patent
Top et al.

(10) Patent No.: US 11,432,155 B2
(45) Date of Patent: Aug. 30, 2022

(54) METHOD AND SYSTEM FOR RELAY ATTACK DETECTION

(71) Applicant: Visa International Service Association, San Francisco, CA (US)

(72) Inventors: Mustafa Top, San Ramon, CA (US); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 523 days.

(21) Appl. No.: 16/477,852

(22) PCT Filed: Mar. 15, 2017

(86) PCT No.: PCT/US2017/022476
§ 371 (c)(1),
(2) Date: Jul. 12, 2019

(87) PCT Pub. No.: WO2018/169522
PCT Pub. Date: Sep. 20, 2018

(65) Prior Publication Data
US 2019/0373475 A1 Dec. 5, 2019

(51) Int. Cl.
*H04W 12/122* (2021.01)
*H04W 12/61* (2021.01)
(Continued)

(52) U.S. Cl.
CPC ........ *H04W 12/122* (2021.01); *G06Q 20/352* (2013.01); *H04W 12/037* (2021.01);
(Continued)

(58) Field of Classification Search
CPC ................. H04L 63/08; H04L 63/1466; H04L 2463/102; H04L 63/1408; H04L 63/1416;
(Continued)

(56) References Cited

U.S. PATENT DOCUMENTS 7,107,242 B1 * 9/2006 Vasil ...................... G06Q 20/40
705/35
9,640,001 B1 * 5/2017 Vazquez ............... H04L 63/107
(Continued)

FOREIGN PATENT DOCUMENTS

| CN | 103679058 A | 3/2014 |
| CN | 104917746 A | 9/2015 |

OTHER PUBLICATIONS

EP17900418.9, "Extended European Search Report", dated Jan. 22, 2020, 9 pages.
(Continued)

*Primary Examiner* — Lizbeth Torres-Diaz
(74) *Attorney, Agent, or Firm* — Kilpatrick Townsend & Stockton LLP

(57) ABSTRACT

A method preventing relay attacks between first and second devices is disclosed. The method includes providing, by a first device, a command message, receiving a request message and providing a response message to a second device. The time period between the receipt of the command message and the transmission of the response message by the first device is compared to another time period between the time when the command message was sent and the response message was received by the second device. If those times substantially match, then the first device can have assurance that a relay attack is not occurring.

20 Claims, 6 Drawing Sheets

(51) Int. Cl.
   *H04W 12/63*   (2021.01)
   *G06Q 20/34*   (2012.01)
   *H04W 12/037*  (2021.01)
   *H04W 12/47*   (2021.01)

(52) U.S. Cl.
   CPC .......... *H04W 12/47* (2021.01); *H04W 12/61* (2021.01); *H04W 12/63* (2021.01)

(58) Field of Classification Search
   CPC . H04W 12/06; H04W 12/122; H04W 12/069; H04W 12/63; H04W 12/47; H04W 12/61
   See application file for complete search history.

(56) References Cited

U.S. PATENT DOCUMENTS

| | | | |
|---|---|---|---|
| 2010/0201534 A1 | 8/2010 | Busch-Sorensen | |
| 2012/0185398 A1 | 7/2012 | Crume | |
| 2014/0282947 A1* | 9/2014 | Ignatchenko | H04L 63/08 726/6 |
| 2014/0365776 A1* | 12/2014 | Smets | G06Q 20/401 713/171 |
| 2015/0082427 A1* | 3/2015 | Ivanchykhin | H04W 12/069 726/22 |
| 2015/0222658 A1 | 8/2015 | Kim et al. | |
| 2015/0302230 A1 | 10/2015 | Wacker et al. | |
| 2019/0373475 A1* | 12/2019 | Top | G06Q 20/352 |
| 2022/0051285 A1* | 2/2022 | Scislowski | G06Q 30/0223 |

OTHER PUBLICATIONS

Henzl et al., "Preventing Real-world Relay Attacks on Contactless Devices", IEEE, International Carnahan Conference on Security Technology (ICCST), Oct. 13, 2014, pp. 1-6.
EP17900418.9 , "Office Action", dated Feb. 16, 2021, 6 pages.
International Search Report and Written Opinion, dated Nov. 30, 2017, In International Patent Application No. PCT/US2017/022476, 13 pages.
CN201780088389.1 , "Office Action", dated Jul. 22, 2021, 18 pages.
CN201780088389.1 , "Office Action", dated Mar. 10, 2022, 16 pages.
EP17900418.9, "Office Action", dated May 17, 2022, 4 pages.

* cited by examiner

METHOD AND SYSTEM FOR RELAY ATTACK DETECTION

CROSS-REFERENCES TO RELATED APPLICATIONS

This application is the U.S. National Phase of PCT Application No. PCT/US2017/022476, filed Mar. 15, 2017, the disclosure of which is incorporated by reference.

BACKGROUND

Relay attacks are possible in contact and contactless access transactions such as payment transactions. For example, FIG. 1 shows a victim's contactless card 40 that may be remotely located relative to a contactless terminal 10 at a resource provider such as a merchant.

Although the contactless card 40 and the contactless terminal 10 are very far apart in this example, an attacker (e.g., two people working together to steal information or defraud legitimate users) can use two NFC enabled phones 20, 30, and two smartphone applications 20A, 30A on the NFC enable phones 20, 30 to conduct a relay attack. In a typical relay attack, the attacker uses phone A 30 with an NFC reader mode application to tap and communicate with the contactless card 40 in the victim's pocket. The attacker can use phone B 20 with an application 20A, to tap and communicate with a contactless terminal 10 at a merchant or other resource provider. The two applications 20A, 30A on the two phones 20, 30 are connected through the mobile Internet 50.

Command messages issued by the contactless terminal 10 are relayed from phone B 20 to phone A 30, and are then received by victim's contactless card 40. The victim's contactless card 40 then responds to the command messages. Access information on the card 40 (e.g., payment information such as a primary account number (PAN)) can then be relayed from phone A 30 to phone B 20, and then to the contactless terminal 10. By performing such a relay attack, the attacker can conduct an access transaction (e.g., a purchase transaction) using the victim's contactless card 40 without taking victim's card 40 from his/her possession. Although this particular example is one which involves a merchant, it is understood that this problem can exist in other situations where access to a resource is desired (e.g., an attempt to access a building, or an attempt to access data inside of a computer).

As shown above, data between two legitimate devices (the contactless terminal 10 and the contactless card 40) are transferred without any change (or with a minimal change). There is a need for an attack recognition mechanism that can address this problem, preferably without substantially changing existing access transaction infrastructures.

Embodiments of the invention address these and other problems.

BRIEF SUMMARY

Embodiments of the invention are directed to methods and system that can prevent relay attacks between a portable device and an access device, thus precluding attackers from accessing data that they are not authorized to access.

One embodiment of the invention is directed to a method. The method comprises generating and sending, by a first device, a command message to a second device in a transaction conducted between the first device and the second device. In some embodiments, the first device may be an access device such as a POS terminal, while the second device may be a card such as a payment card.

The second device thereafter generates a first request message and transmits the first request message to the first device. The first device then receives the first request message and generates a first response message, and transmits it to the second device. The first request message may be a first wait time extension request message.

At some point in time, when the second device is ready to respond to the command message, a data message is generated by and sent from the second device to the first device. The data message comprises an encrypted value comprising an encrypted first time period. The first time period may be determined by the second device and may be associated with the command message, the first request message, and/or the first response message. For example, the first time period may be measured from a time when the command message is received by the second device and a time when the first request message is transmitted by the second device to the first device. The method further includes decrypting the encrypted value to determine the first time period, and then comparing the first time period to a second time period determined by the first device. The second time period may be associated with the command message, the first request and/or the first response. For example, the second time period can be measured from a time when the command message is transmitted by the first device to the second device and a time when the first request message is received by the first device. If the first time period and the second time period are not within a predetermined threshold, then the second device may record that the first and second time periods are not within the predetermined threshold and may optionally initiate a decline of the transaction. In some embodiments, the access device may stop the transaction or may display an error message. If the first time period and the second time period are within a predetermined threshold, then the first device may allow the transaction to proceed.

Another embodiment of the invention is directed to a first device configured to perform the above method.

Another embodiment of the invention is directed to a method comprising receiving, by a second device, a command message from a first device, and then generating a first request message. The second device then transmits the first request message to the first device. The second device subsequently generates a data message. The data message may be a command message response message, and may comprise an encrypted value. The encrypted value may comprise a first time period determined by the second device. The first time period may be associated with the command message, the first request message and/or the first response message. For example, the first time period may be measured from a time when the command message is received by the second device and a time when the first request message is transmitted by the second device to the first device. Once the data message is generated, it may be transmitted to the first device. After it is received, the first device compares the first time period to a second time period determined by the first device. The second time period may be associated with the command message, the first request message and/or the first response message. For example, the second time period may be measured from a time when the command message is transmitted by the first device to the second device and a time when the first request message is received by the first device.

Another embodiment of the invention is directed to a second device configured to perform the above method.

These and other embodiments of the invention are described in further detail below in the Detailed Description with reference to the Figures.

DETAILED DESCRIPTION

Figure 1:
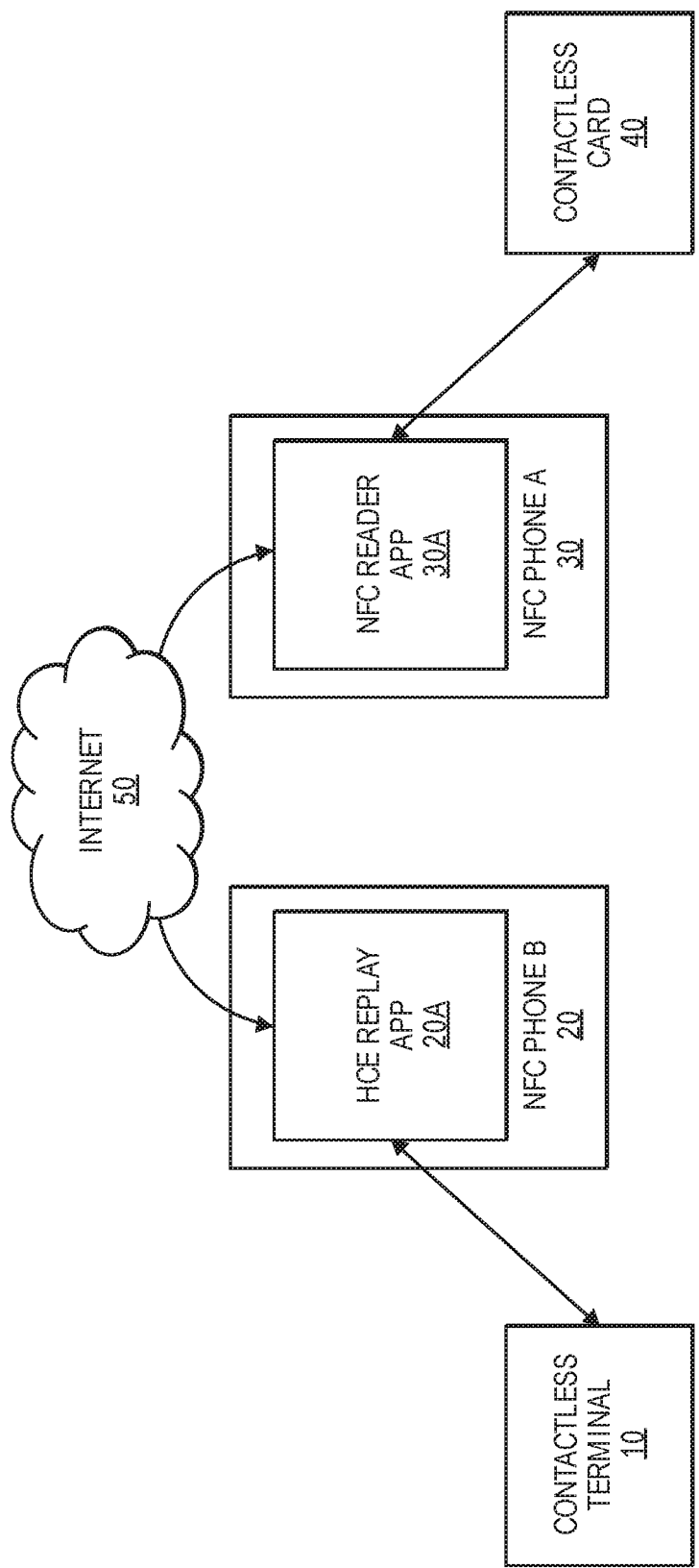
FIG. 1 shows a system diagram illustrating a relay attack.

One embodiment of the invention is directed to a method. The method comprises generating and sending, by a first device, a command message to a second device in a transaction conducted between the first device and the second device. In some embodiments, the first device may be an access device such as a POS terminal, while the second device may be a card such as a payment card. Note that the terms "first," "second" and the like are not restrictive, but can used as labels to represent different devices or objects.

The second device thereafter generates a first request message and transmits the first request message to the first device. The first device then receives the first request message and generates a first response message, and transmits it to the second device. The first request message may be a wait time extension request message.

At some point in time, when the second device is ready to respond, a data message is sent from the second device to the first device. The data message comprises an encrypted value comprising an encrypted first time period. The first time period may be determined by the second device and may be measured from a time when the command message is received by the second device and a time when the first request message is transmitted by the second device to the first device. The method further includes decrypting the encrypted value to determine the first time period, and comparing the first time period to a second time period determined by the first device. The second time period can be measured from a time when the command message is transmitted by the first device to the second device and a time when the first request message is received by the first device. If the first time period and the second time period are not within a predetermined threshold, then the second device may record that the first and second time periods are not within the predetermined threshold, and may optionally decline the transaction. If the first time period and the second time period are within a predetermined threshold, then the first device may record that the first time period and the second time period are within the predetermined threshold, and may optionally allow the transaction to proceed. The first device may also decrypt in the data message the encrypted unpredictable numbers and the number of request messages sent by the second device.

The amount of the threshold may vary in embodiments of the invention, but exceeding the threshold may be indicative of a potential relay attack For example, if the difference between the first and second time periods was more than, for example, 10, 20, or 30 percent of the value of either of the first and second time periods. For example, first and second time periods that are respectively 15.00 milliseconds and 15.02 milliseconds would be sufficient close that they are within the threshold. Conversely, if the first and second time periods are 15 and 20 milliseconds respectively, then this may exceed the threshold.

Specific embodiments of the invention can include a portable device sending SWTX (wait time extensions) message data with specific features as signed and secured. The SWTX data are unknown to the outside observer (attacker) before sending them. The features may include (i) an unknown number of SWTX requests, (ii) unknown time periods associated with the SWTX transmissions, and (iii) session based unpredictable WTXM parameters (e.g., nonces) in the transmitted SWTX messages.

The implementation of such mechanisms can eliminate attacking devices that can be fast enough to recognize an SWTX exchange upfront and send a message immediately before the original exchange ends. Such attacking devices would need to follow each bit to re-send the SWTX message bits. This would introduce a delay at or around microsecond levels, since the WTXM parameters and the timings of the SWTX message transmissions are unknown to the attacker.

Any attacker device that would attempt to circumvent embodiments of the invention would need to be complicated, and would need to achieve much stronger timings (less than 1 millisecond, possibly even less than 10-20 microsecond levels). The solution provided by embodiments of the invention would prevent an attack using a mobile phone that introduces a delay of multiple milliseconds. If desired, the protection afforded by embodiments of the invention can be restricted to nanosecond levels by terminal manufacturers. This would make the attacker work even harder, thereby forcing attackers to create more complicated devices. Current contactless terminals are expected to be more accurate than 10 microsecond levels.

In some embodiments, some parameters associated with the SWTXs can be known only to legitimate objects in the system (i.e., the portable device and the access device). This could be achieved by, but is not limited to the following ways:

1. The access device (e.g., terminal) can provide unpredictable SWTX parameters/timings and unpredictable numbers to the portable device (e.g., a card) in a secure (signed, etc.) manner during the transaction. The portable device (e.g., the card) determines them and applies them to a lower operational layer to be implemented.
2. The portable device manufacturer loads the SWTX parameters into the portable devices for use during transactions. Such parameters can be forwarded to the access device in a secure manner.
3. The portable device generates unpredictable SWTX parameters internally and informs the access device in a secure manner.
4. The portable device and the access device could partially generate and share the parameters. For example, the unpredictable number can be generated by the portable device, while the access device sends the number of SWTXs and the timings for the SWTXs.

Prior to discussing embodiments of the invention, some terms will be described.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Figure 2:
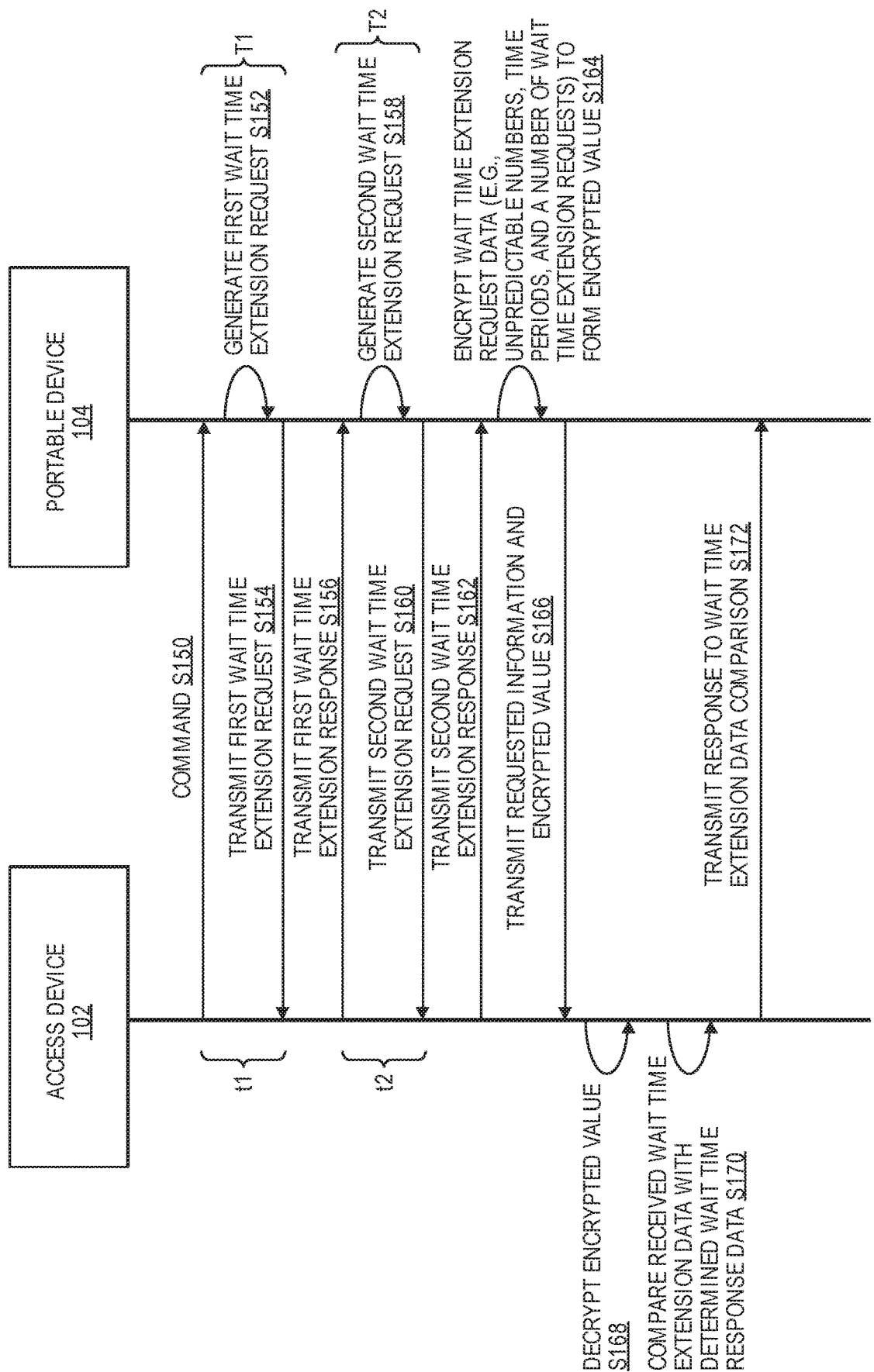
FIG. 2 shows a block diagram of a system including an access device and a portable device, and a method that can be performed in the illustrated system.

FIG. 2 shows a block diagram of a system including an access device 102 and a portable device 104. The access device 102 may be an example of a first device and the portable device 104 may be an example of a second device. The access device 102 may be a terminal, while the portable device 104 may be a mobile device such as a mobile phone or a card.

The access device 102 and the portable device 104 may ordinarily communicate with each other via a direct short range wireless communication protocol such as NFC (near field communications), Bluetooth™, Bluetooth™ Low Energy (BLE), infrared, etc.

Figure 3:
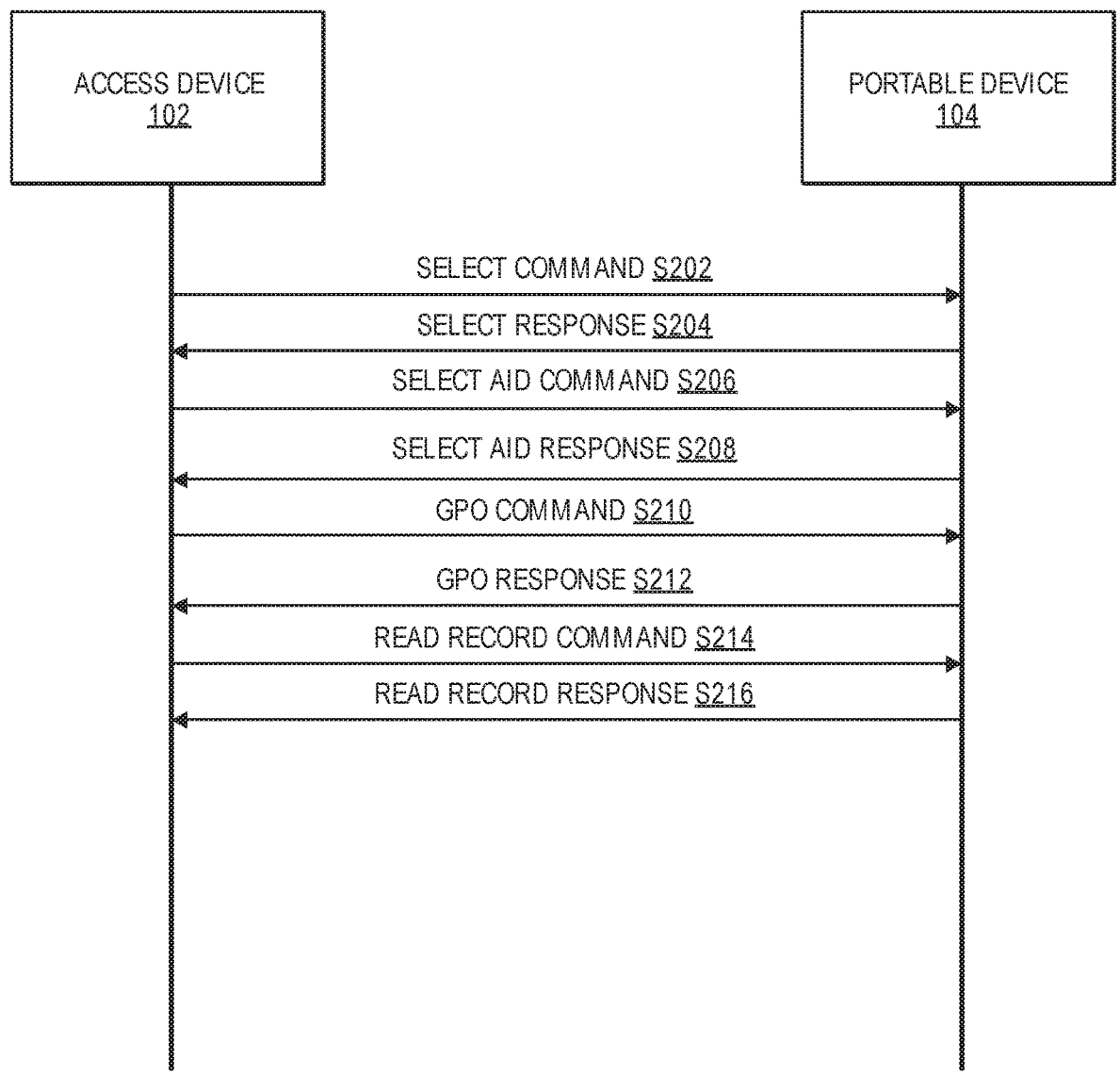
FIG. 3 shows a block diagram of a system including an access device and a portable device, and descriptions of exemplary command messages and responses that may be transmitted between the access device and the portable device.

Prior to step S150, the access device 102 can generate a command message, which may instruct the portable device 104 to perform some type of action. The action might be, for example, to retrieve stored data within the portable device 104 and send it to the access device 102. In step S150, the command message may be transmitted (e.g., wirelessly using RF signals) to the portable device 104. Examples of command messages are shown in FIG. 3 in steps S202, S206, S210, and S214. These steps are described in more detail below. The transmission of command messages such as these to the portable device 104 results in some type of command response message from the portable device 104. The command response message may be an example of a data message which may provide the information requested in the command message sent in step S150.

In step S152, the portable device 104 may not be able to immediately respond to the access device 102. In legitimate interactions between the portable device 104 and the access device 102, the portable device 104 may not be able to respond for a number of reasons. For example, the portable device 104 may take longer than usual to retrieve the data requested by the command message S150. If the portable device 104 experiences a delay in responding, it may generate a first wait time extension request message.

In embodiments of the invention, wait time extension request messages may be generated and transmitted by the portable device 104 to the access device 102 as a means to prevent relay attacks and need not be predicated upon the determination that the portable device 104 is experiencing a delay in responding. Thus, the portable device 104 may be programmed to provide generate and transmit the first wait time request message S152, S154 to the access device 102 at an unpredictable, arbitrary, or predetermined time after the command S150 is received by the portable device 104.

Once generated, in step S154, the first wait time extension request message may be transmitted to the access device 102. The first wait time extension request message may comprise a first unpredictable number such as $WTXM_1$. The time period between the time that the command S150 was received the portable device 104 and the time when the first wait time extension request was transmitted by the portable device 104 may be T1. T1 may be, for example, 35 milliseconds. The time period between the time when the command S150 was transmitted by the access device 102 and the time when the first wait time extension request S154 was received by the access device 102 may be t1. t1 may be, for example, substantially the same as T1 if there is no relay attack being conducted. For example, if no relay attack is being conducted, t1 may be 35.02 milliseconds. The value t1 may be temporarily stored in a memory in the access device 102.

After receiving the first wait time extension request message S154, in step S156, the access device 102 may transmit a first wait time extension response message to the portable device 104. The first wait time extension response message S156 acknowledges receipt of the first wait time extension request message S154.

If the portable device 104 is still not able to respond to the initial command S150, it may generate a second wait time extension request S158 under normal circumstances. However, as noted above, the second wait time extension request S158 may be sent by the portable device 104 to the access device 102 as a means to prevent relay attacks so the transmission of the second wait time extension request may be performed even if it is not predicated upon a processing delay on the part of the portable device 104. The second wait time extension request S158 can then be transmitted to the access device 102 in step S160. The transmission of the second wait time request in S160 may occur at an arbitrary, calculated or a predetermined time known to the portable device 104. The second wait time extension request message may also comprise a second unpredictable number such as $WTXM_2$.

The time period between the time that the first wait time extension response S156 was received by the portable device 104 and the time when the second wait time extension request S162 was transmitted by the portable device 104 may be T2. For example, T1 may be 12 milliseconds. The time period between the time that the first wait time extension response S156 was sent by the access device 102 and the time when the second wait time extension request S160 was received by the access device 102 may be t2. For example, if no relay attack is present, then t2 may be 12.02 milliseconds. The value t2 may be stored by the access device 102 in a memory in the access device 102.

After receiving the second wait time extension request S160, the access device 102 may then generate and transmit a second wait time extension response S162 to the portable device 104. This can occur if the access device 102 has not received a complete response to the initial command S150.

Steps S154, S156, S160, and S162 may be repeated as needed if the portable device 104 needs more time to respond. Note, however, that the access device 102 could have a timeout time which sets a limit on how many wait time extension requests are permitted before the access device 102 terminates the interaction with the portable device 104.

At step S164, when the portable device 104 is capable of responding to the command in step S150, the portable device 104 may generate the requested data (e.g., responsive to the command S150) for an appropriate data response message to be transmitted from the portable device 104 to the access device 102. In addition to the requested data, the data response message, may include an encrypted value. The encrypted value may comprise information relating to the described request and response messages. For example, the encrypted value can comprise, in encrypted form, the number of request messages sent by the portable device 104 to the access device 102, the values T1 and T2, and the first and second unpredictable numbers (or other parameters). One or more of these pieces of data may be concatenated and then encrypted to form the encrypted value. The encrypted value may be included in the data response along with the requested data.

To produce the encrypted value, the portable device 104 may have been pre-provisioned with the symmetric key, or may derive the symmetric key that can be used to encrypt the data to form the encrypted value. The corresponding symmetric key may also be pre-provisioned or derived by the access device 102. Alternatively, the portable device 104 may receive a public key from the access device 102 or some other entity and the corresponding private key may be held by the access device 102. The portable device 104 may use the public key to encrypt data and the access device 102 may use the corresponding private key to decrypt the encrypted data. Any suitable encryption/decryption process may be used including DES, triple DES, AES, ECC, etc.

In step S166, the data request with the requested information and the encrypted value may be transmitted from the portable device 104 to the access device 102.

In step S168, the access device 102 may then decrypt the encrypted value with an encryption key to recover the number of request messages sent from the portable device 104 to the access device 102, the time periods T1 and T2, and the first and second unpredictable numbers.

In step S170, after the access device 102 decrypts the encrypted values, the access device 102 may then compare and/or analyze the wait time extension data to determine if a relay attack has occurred. More specifically, the value t1 may be compared to T1, and the value t2 may be compared to value T2. If the values match (e.g., are within a predetermined threshold), then a relay attack did not occur. Further, the number of wait time extension requests received by the access device 102 may be compared with the number of wait time extension requests that are noted in the received data message. If the values match, then this is evidence that a relay attack did not occur. Lastly, the first and second unpredictable numbers received in the data message S166 may be compared with the first and second unpredictable numbers received in the first and second wait time extension requests (S154, S160). If the numbers match, then it is unlikely that a replay attack occurred.

In step S172, the result of the comparisons may be stored by the access device 102, and may optionally be transmitted to the portable device 104. The access device 102 may also continue with the transaction. If the result of the comparisons suggest that the transaction may be the subject of a relay or replay attack, then the access device 102 may store this information, and may optionally terminate the transaction and/or display an error message.

Embodiments are not limited to the specific process flow described above. For example, in some embodiments, instead of transmitting the encrypted value including the wait time extension data in the response S166 to the command S150, the encrypted value may be transmitted in any subsequent data transmission from the portable device 104 to the access device 102. For example, with reference to FIG. 3, which is described in more detail below, the command could be the Select Command S202 and the encrypted value may be sent in the GPO Response S214 or the Read Record Response S216, and need not be sent in the corresponding Select Response S204.

In another variant, the above request messages may be characterized as being "protection request messages" in some embodiments. Such protection request messages (e.g., which may include an unpredictable number) may be sent first, after a specific command, before any real request messages (e.g., real wait time extension request messages that would be sent for real delays that the second device might experience).

In yet another variant, it is noted that the time periods t1, t2, T1, and T2 shown in FIG. 2 do not necessarily need to be measured as shown. In embodiments of the invention, the first and second time periods may be associated with the command, the first request and/or the first response in any suitable manner. For example, in some embodiments, T2 could be measured, by the portable device 104, from the transmission of the wait time extension request S160 and the receipt of the second wait time extension response S162. t2 could be measured from the from the receipt by the access device 102 of the second time extension request and the transmission of the wait time extension response S162. Thus, embodiments of the invention may compare the time period between any two successive messages received and transmitted, or transmitted and received, by the portable device 104, with any two corresponding successive messages, received and transmitted, or transmitted and received by the access device 102 to determine if a relay attack has occurred.

FIG. 3 shows a flow diagram illustrating more detailed interactions between an access device 102 (an example of an access device) and a portable device 104 (an example of a payment device) in a payment transaction. The various commands in FIG. 3 may correspond to the command S150 in FIG. 2, and the responses may correspond to examples of data messages as described above with respect to FIG. 2.

In step 202, when the access device 102 detects a presence of the portable device 104, a select command is sent from the access device 102 to the portable device 104. The select command may be a select PPSE command, which can be used to identify the payment environment supported by the access device 102 and the portable device 104. The command may also include information regarding which payment application(s) (e.g., a list of AID(s)) may be available on the portable device 104

Upon receiving the command in S202, the portable device 104 may include an application which may identify and process the request by recognizing the payment environment identifier (e.g., PPSE name) included in the request, and respond by sending an available applications response S204 back to access device 102. The available applications response S204 may include a list of available AIDs, and may include the payment environment identifier (e.g., PPSE name). In some embodiments, the available applications response S204 may be in the form of a select PPSE response and may include PPSE file control information (FCI).

When the access device 102 receives the available applications response S204, the access device 102 selects a suitable application from the list of applications received in the available applications response S204 (e.g., by selecting an AID from the available AID(s) received in the available application(s) response S204). In some cases, the selected AID can be the highest priority AID available that is supported by access device 102. Access device 102 may send an application selection with the selected AID to the application on the portable device 104. In some embodiments, the application selection can be in the form of a select AID command S206.

Upon receiving the application selection, the application of the portable device 104 may send a terminal transaction data request to request transaction data from access device 102 which may be needed to execute the transaction using the selected application/AID. In some embodiments, the terminal transaction data request may be in the form of a select AID response S208 and may include AID file control information (FCI) with the selected AID as a dedicated file name. The terminal transaction data request may include a list of transaction data identifiers to request the appropriate data from access device 102, and the list of transaction data identifiers can be in the form of a processing options data object list (PDOL). The transaction data requested by the application on the portable device 104 may include terminal transaction qualifiers (TTQ), an authorized amount, other amount, terminal country code, terminal verification results, transaction currency code, transaction data, transaction type, and/or an unpredictable number. The terminal transaction data request may also include other data such as the FCI issuer discretionary data, application program identifier, and language preference.

After receiving the terminal transaction data request, access device 102 may send, to the application of the portable device 104, the terminal transaction data requested by the mobile application. In some embodiments, the terminal transaction data may be sent in the form of a get processing options (GPO) command S210, and may include the requested terminal transaction data in a processing options data object list (PDOL). In some embodiments, the terminal transaction data (e.g., terminal transaction qualifiers (TTQ)) may include a transaction type indicator indicating whether access device 102 supports integrated chip based transactions or magnetic stripe based transactions. Thus, in the chip based transaction illustrated in FIG. 3, access device 102 may send a transaction type indicator in the terminal transaction data to indicate that access device 102 supports integrated chip based transactions. In some embodiments, the terminal transaction data (e.g., terminal transaction qualifiers (TTQ)) may also include a consumer verification method (CVM) requirement indicator to indicate whether a CVM is required by access device 102, and also CVM type indicators indicating the types of CVM supported by access device 102. Examples of CVMs that may be supported by access device 102 can include online PIN, signature, and/or consumer device CVM (CDCVM) such as a passcode used on portable device 104.

Once the application of the portable device 104 receives terminal transaction data, the application may increment its Application Transaction Counter (ATC), generate dynamic transaction processing information using at least some of the received terminal transaction data, and send a set of transaction processing information including the generated dynamic transaction processing information to access device 102. In some embodiments, the transaction processing information can be sent in the form of a GPO response S212. In some embodiments, the transaction processing information may include one or more application file locators (AFLs) that can be used as file address(es) by access device 102 to read account data stored on portable device 104, and an application interchange profile (AIP) that can be used to indicate the capabilities of the application.

For an integrated chip based transaction, the transaction processing information may include a transaction cryptogram dynamically generated using a LUK (limited use key), track-2 equivalent data, and additional data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the application on the portable device 104, a remote server (e.g., the cloud), etc. The CVM verified type is used to indicate the CVM method used for the transaction. The CVM method may be a passcode, biometric (e.g., fingerprint), pattern lock (e.g., for a screen lock), signature, or online PIN.

If the terminal transaction data received from access device 102 indicates that the CVM supported by access device 102 is a CDCVM, the CVM verifying entity and the CVM verified type can be set according to the configuration parameters of the account. For example, if the account supports CVM using a passcode that is verified by the operating system of portable device 104, the CVM verifying entity can be set to the operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data received from the access device 102 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK have been exceeded.

The form factor indicator (FFI) may include information about portable device 104. The form factor indicator (FFI) may indicate that portable device 104 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether portable device 104 is capable of using a passcode (can be separate from a PIN that is used during transactions), has a signature panel, has a hologram, has support for card verification values (e.g., CVV2), is capable of two-way messaging to exchange identifying information between the issuer and the user, and/or has support for using cloud-based credentials (e.g., LUK, token, etc.). The form factor indicator (FFI) may also include a payment transaction technology indicator indicating that portable device 104 supports contactless transactions (e.g., NFC).

After the access device 102 receives the transaction processing information, the access device 102 may send an account data request to the application of portable device 104 to read additional account data that may be stored on portable device 104. In some embodiments, the account data request may be in the form of a read record command S214, and may include an application file locator (AFL) indicating the address or location of the account data that access device 102 is attempting to read. The AFL included in the account data request may correspond to an AFL in the transaction processing information provided from portable device 104.

In response to receiving the account data request from access device 102, portable device 104 may send the account data stored at the location indicated by the AFL to access device 102. In some embodiments, the account data may be sent in the form of a read record response S216. The account data may include, for example, application usage control that indicates the issuer's restrictions on the usage and services allowed for the application, the cardholder's name, customer exclusive data, issuer country code, token requester ID (e.g., if a token is used), and/or other account related data that is accessible at the AFL location.

Once the access device 102 has received the requisite data from the transaction processing information and/or one or more account data transmissions, some or all of the data elements in the transaction processing information and/or one or more account data transmissions can be used by access device 102 to generate a transaction authorization request message to request authorization of the transaction from the issuer. For example, in some embodiments, the transaction authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

Figure 4:
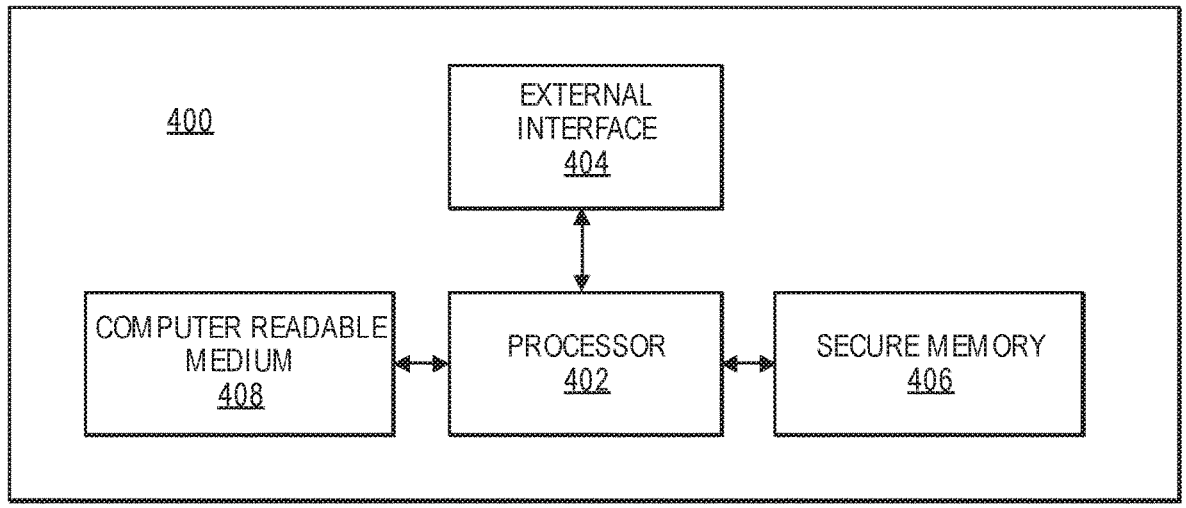
FIG. 4 shows a block diagram of a portable device according to an embodiment of the invention.

FIG. 4 shows a block diagram of a portable device 400 according to an embodiment of the invention. The portable device 400 may include a number of components including, but not limited to a processor 402, as well as a secure memory 406, a computer readable medium 408, and an external interface 404 that are operatively coupled to the processor 402.

The external interface 404 may include a contact or contactless element. an exemplary contactless element may include an antenna for transmitting or receiving data from an external device such an access device. An exemplary contact element may include two or more electrical contacts which can allow the portable device 400 to communicate with an external device then the portable device 400 and the external device are in electrical communication through the electrical contacts.

The memory 406 may store credentials. As noted above, credentials may include account identifiers, access data for accessing secure locations, etc.

The computer readable medium 408 may comprise code, executable by the processor 402, to implement a method comprising: receiving, by a second device, a command message from a first device; generating, by the second device, a first request message; transmitting, by the second device, the first request message to the first device; generating, by the second device, a data message, wherein the data message comprises an encrypted value comprising an encrypted first time period, the first time period determined by the second device and being associated with any of the preceding messages such as being measured from a time when the command is received by the second device and a time when the first request message is transmitted by the second device to the first device; and transmitting, by the second device, the data message to the first device, wherein the first device compares the first time period to a second time period determined by the first device and being associated with any of the preceding messages such as being measured from a time when the command is transmitted by the first device to the second device and a time when the first request message is received by the first device.

Figure 5:
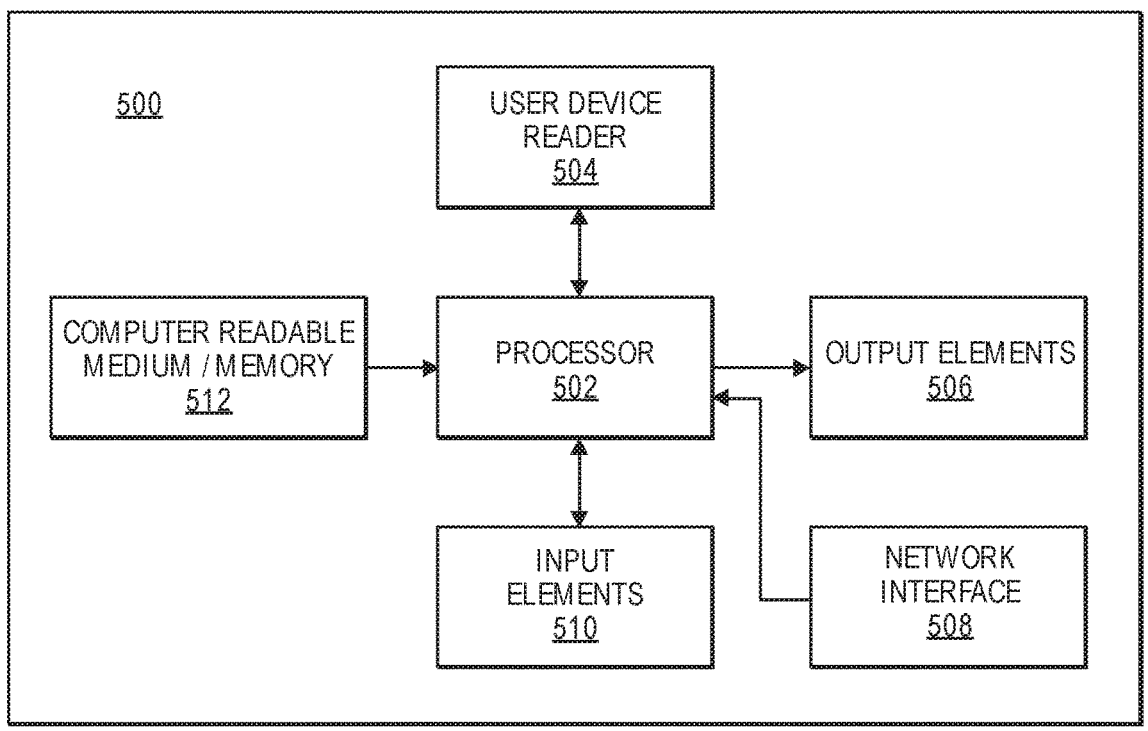
FIG. 5 shows a block diagram of an access device according to an embodiment of the invention.

FIG. 5 shows a block diagram of an access device 500 according to an embodiment of the invention. The access device 500 may comprise a processor 502. A portable device reader 504, output elements 506, a network interface 508, input elements 510, and a computer readable medium/ memory 512 may be operatively coupled to the processor.

The portable device reader 504 may comprise any suitable device capable of reading, providing, or writing data to or from a portable device. Suitable portable device readers include antennas, electrical contacts, etc.

Output elements 506 may comprise any suitable devices that may output data. Examples of output elements 506 may include display screens, speakers, and data transmission devices.

The network interface 508 may include an interface that can allow the access device 500 to communicate with external computers.

The input elements 510 may include any suitable device capable of inputting data into the access device 500. Examples of input devices include buttons, touchscreens, touch pads, microphones, etc.

The computer readable medium/memory 512 may comprise one or more data storage devices. Such data storage devices may store code or applications which can cause the access device 500 to perform the functions described herein. In some embodiments, the computer readable medium may comprise code, executable by the processor 502 for implementing a method comprising: generating and sending, by a first device, a command messages to a second device in a transaction conducted between the first device and the second device, wherein the second device thereafter generates a first request message and transmits the first request message to the first device; receiving, by the first device, the first request message; generating, by the first device, a first response message; transmitting, by the first device, the first response message to the second device; receiving, by the first device, a data message from the second device, the data message comprising an encrypted value comprising an encrypted first time period determined by the second device, the first time period being associated with previously described messages such as being measured from a time when the command is received by the second device and a time when the first request message is transmitted by the second device to the first device; decrypting, by the first device, the encrypted value to determine the first time period; comparing, by the first device, the first time period to a second time period determined by the first device and being associated with any of the preceding messages such as being measured from a time when the command is transmitted by the first device to the second device and a time when the first request message is received by the first device; if the first time period and the second time period are not within a predetermined threshold, then recording that the first and second time periods are not within the predetermined threshold, and optionally initiating a decline of the transaction; and if the first time period and the second time period are within a predetermined threshold, then recording that the first and second time periods are not within the predetermined threshold, and optionally allowing the transaction to proceed.

Figure 6:
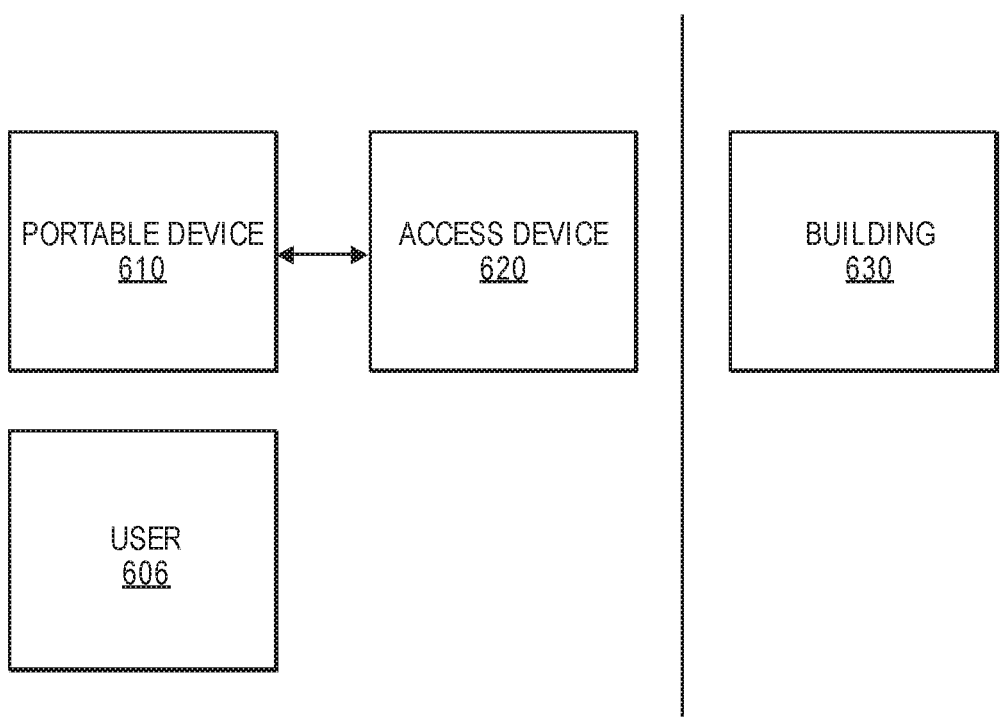
FIG. 6 shows a system diagram including an access device and a building.
Figure 7:
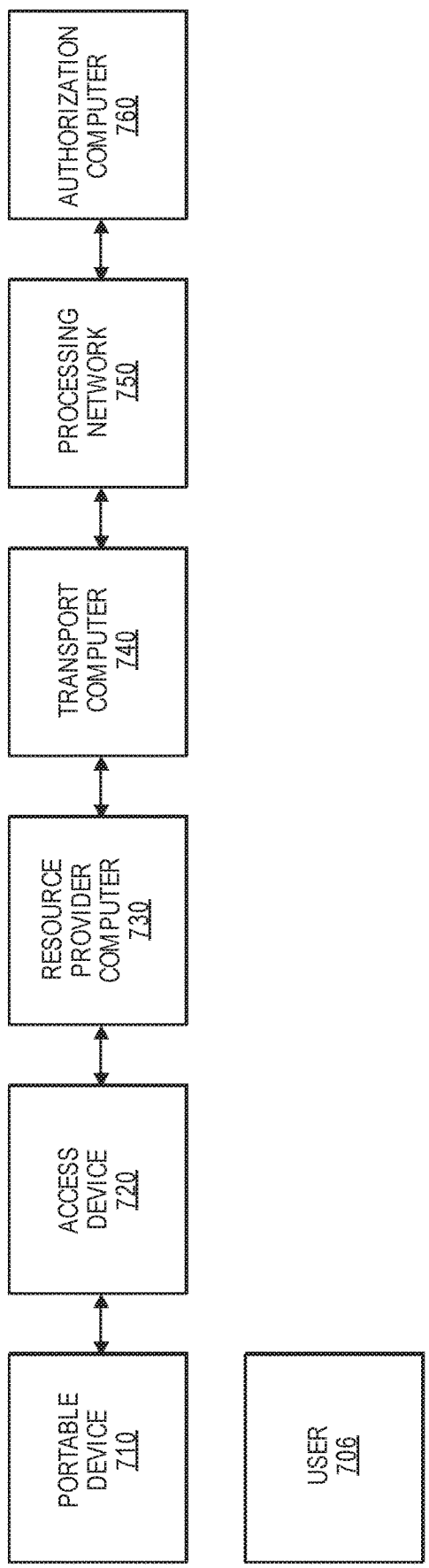
FIG. 7 shows a system diagram illustrating a payment processing system.

FIGS. 6-7 illustrate different situations illustrating the use of a portable device with an access device when attempts are made to access resources such as goods, services, or locations.

FIG. 6 shows a block diagram of a building access system. FIG. 6 shows a portable device 610 operated by a user 606. The portable device 610 can interact with the access device 620 and pass access data to the access device 620. The access device 620 may locally verify the received access data or it may communicate with a remotely located authentication server computer (not shown). The remotely located authentication server computer may verify that the access data is authentic and may transmit a signal indicating this back to the access device 620. The access device 620 may then proceed to let the user 606 enter the building 630.

FIG. 7 shows a block diagram of a transaction processing system that can use a portable device with access data. FIG. 7 shows a user 706 that can operate a portable device 210. The user 706 may use the portable device 710 to pay for a good or service at a resource provider such as a merchant. The resource provider may operate a resource provider computer 730 and/or an access device 720. The resource provider may communicate with an authorization computer 760 (e.g., an issuer computer) via a transport computer 730 (e.g., an acquirer computer) and a processing network 750 (e.g., a payment processing network).

The processing network 250 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a portable device 710 at an access device 720 (e.g. POS location) can be described as follows. A user 706 presents his or her portable device 710 to an access device 720 to pay for an item or service. The portable device 710 and the access device 720 interact such that access data from the portable device 710 (e.g. PAN, a payment token, verification value (s), expiration date, etc.) is received by the access device 720 (e.g. via contact or contactless interface). The resource provider computer 730 may then receive this information from the access device 720 via an external communication interface. The resource provider computer 730 may then generate an authorization request message that includes the information received from the access device 720 (i.e. information corresponding to the portable device 710) along with additional transaction information (e.g. a transaction amount, merchant specific information, etc.) and electronically transmits this information to a transport computer 740. The transport computer 740 may then receive, process, and forward the authorization request message to a processing network 750 for authorization.

In general, prior to the occurrence of a credit or debit-card transaction, the processing network 750 has an established protocol with each authorization computer on how the issuer's transactions are to be authorized. In some cases, such as when the transaction amount is below a threshold value, the processing network 750 may be configured to authorize the transaction based on information that it has about the user's account without generating and transmitting an authorization request message to the authorization computer 760. In other cases, such as when the transaction amount is above a threshold value, the processing network 750 may receive the authorization request message, determine the issuer associated with the portable device 710, and forward the authorization request message for the transaction to the authorization computer 760 for verification and authorization. Once the transaction is authorized, the authorization computer 760 may generate an authorization response message (that may include an authorization code indicating the transaction is approved or declined) and transmit this electronic message via its external communication interface to processing network 750. The processing network 750 may then forward the authorization response message to the transport computer 740, which in turn may then transmit the electronic message to comprising the authorization indication to the resource provider computer 730, and then to the access device 720.

At the end of the day or at some other suitable time interval, a clearing and settlement process between the resource provider computer 730, the transport computer 740, the processing network 750, and the authorization computer 760 may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method comprising:
generating and sending, by a first device, a command message to a second device in a transaction conducted between the first device and the second device, wherein the second device thereafter generates a first request message and transmits the first request message to the first device;
receiving, by the first device, the first request message;
generating, by the first device, a first response message;
transmitting, by the first device, the first response message to the second device;
receiving, by the first device, a data message from the second device, the data message comprising an encrypted value comprising a first time period in encrypted form, the first time period determined by the second device, and being associated with the command message, the first request message, or the first response message;
decrypting, by the first device, the encrypted value to determine the first time period;
comparing, by the first device, the first time period to a second time period determined by the first device, the second time period being associated with the command message or the first request message;
when the first time period and the second time period are not within a predetermined threshold, recording that the first and second time periods are not within the predetermined threshold, and initiating a decline of the transaction; and
when the first time period and the second time period are within the predetermined threshold, then recording that the first and second time periods are within the predetermined threshold, and allowing the transaction to proceed,
the first time period is measured from a time when the command message is received by the second device and a time when the first request message is transmitted by the second device to the first device, and
the second time period is measured from a time when the command message is transmitted by the first device to the second device and a time when the first request message is received by the first device.

2. The method of claim 1, wherein the first request message is a time extension request message and the first response message is a time extension response message.

3. The method of claim 2, wherein the predetermined threshold is a first predetermined threshold, and therein the method further comprises, after transmitting the first response message and before receiving the data message:
receiving, by the first device, a second request message from the second device;
generating, by the first device, a second response message;
transmitting, by the first device, the second response message to the second device;
and wherein the data message further comprises a third time period in encrypted form, the third time period determined by the second device and being measured from a time when the first response message is received by the second device and a time when the second request message is transmitted by the second device to the first device;
and wherein the method further comprises:
decrypting the encrypted third time period;
comparing, by the first device, the decrypted third time period to a fourth time period determined by the first device and being measured from a time when the first response message was transmitted to the second device and a time when the second request message is received by the first device;
when the compared third time period and the fourth time period are not within a second predetermined threshold, then recording that the third time period and the fourth time period are not within the predetermined threshold, and initiating a decline of the transaction; and
when the compared third time period and the fourth time period are within the second predetermined threshold, then recording that the third time period and the fourth time period are within the predetermined threshold, and allowing the transaction to proceed.

4. The method of claim 3, wherein the first request message is a first time extension request message, the first response message is a first time extension response message, the second request message is a second time extension request message, and the second response message is a second time extension response message.

5. The method of claim 3, wherein the first time period and the third time period are different.

6. The method of claim 1, wherein the first device is an access device and the second device is a portable device.

7. The method of claim 1, wherein the encrypted value contains a number of request messages that have been sent from the second device to the first device in encrypted form.

8. The method of claim 1, wherein the first request message comprises an unpredictable number, and wherein the encrypted value contains the unpredictable number in encrypted form.

9. The method of claim 1, wherein the first request message comprises an unpredictable number, and wherein the encrypted value contains a concatenated value comprising the unpredictable number and the first time period in encrypted form.

10. A first device, the first device comprising:
a processor; and
a non-transitory computer readable medium, the non-transitory computer readable medium comprising code, executable by the processor to perform a method comprising:
generating and sending a command message to a second device in a transaction conducted between the first device and the second device, wherein the second device thereafter generates a first request message and transmits the first request message to the first device;
receiving the first request message;
generating a first response message;
transmitting the first response message to the second device;
receiving a data message from the second device, the data message comprising an encrypted value comprising a first time period in encrypted form, the first time period determined by the second device, and being associated with the command message, the first request message or the first response message;
decrypting the encrypted value to determine the first time period;
comparing the first time period to a second time period determined by the first device, the second time period being associated with the command message or the first request message;
when the first time period and the second time period are not within a predetermined threshold, recording that the first and second time periods are not within the predetermined threshold, and initiating a decline of the transaction; and
when the first time period and the second time period are within the predetermined threshold, then recording that the first and second time periods are within the predetermined threshold, and allowing the transaction to proceed,
the first time period is measured from a time when the command message is received by the second device and a time when the first request message is transmitted by the second device to the first device, and
the second time period is measured from a time when the command message is transmitted by the first device to the second device and a time when the first request message is received by the first device.

11. The first device of claim 10, wherein the first request message is a time extension request message and the first response message is a time extension response message.

12. The first device of claim 11, wherein the predetermined threshold is a first predetermined threshold, and wherein the method further comprises, after transmitting the first response message and before receiving the data message:
receiving a second request message;
generating a second response message;
transmitting the second response message to the second device;
and wherein the data message further comprises a third time period in encrypted form, the third time period determined by the second device and being measured from a time when the first response message is received by the second device and a time when the second request message is transmitted by the second device to the first device;
and wherein the method further comprises:
decrypting the encrypted third time period;
comparing the decrypted third time period to a fourth time period determined by the first device and being measured from a time when the first response message was transmitted to the second device and a time when the second request message is received by the first device;
when the compared third time period and the fourth time period are not within a second predetermined threshold, then recording that the third time period and the fourth time period are not within the predetermined threshold, and initiating a decline of the transaction; and
when the compared third time period and the fourth time period are within the second predetermined threshold, then recording that the third time period and the fourth time period are within the predetermined threshold, and allowing the transaction to proceed.

13. The first device of claim 12, wherein the first request message is a first time extension request message, the first response message is a first time extension response message, the second request message is a second time extension request message, and the second response message is a second time extension response message.

14. The first device of claim 12, wherein the first time period and the third time period are different.

15. The first device of claim 10, wherein the first device is an access device and the second device is a portable device.

16. The first device of claim 10, wherein the first device is in the form of a terminal and the second device is in the form of a card.

17. The first device of claim 10, wherein the first request message comprises an unpredictable number, and wherein the encrypted value also includes the unpredictable number in encrypted form.

18. A method comprising:
receiving, by a second device, a command message from a first device in a transaction;
generating, by the second device, a first request message;
transmitting, by the second device, the first request message to the first device;
generating, by the second device, a data message, wherein the data message comprises an encrypted value comprising a first time period determined by the second device, and being associated with the command message or the first request message; and transmitting, by the second device, the data message to the first device, wherein the first device compares the first time period to a second time period determined by the first device, and being associated with the command message or the first request message, wherein when the first time period and the second time period are not within a predetermined threshold, then the first device records that the first and second time periods are not within the predetermined threshold, and initiates a decline of the transaction; and when the first time period and the second time period are within the predetermined threshold, then the first device records that the first time period and the second time period are within the predetermined threshold, and allows the transaction to proceed, and wherein the first time period is measured from a time when the command message is received by the second device and a time when the first request message is transmitted by the second device to the first device, and wherein the second time period is measured from a time when the command message is transmitted by the first device to the second device and a time when the first request message is received by the first device.

19. The method of claim 18, wherein the first request message is a time extension request message.

20. The method of claim 18, wherein the second device is a card and the first device is an access device.

* * * * *